UNITED STATES PATENT OFFICE.

CYPRIEN TESSIÉ DU MOTAY AND AUGUSTE J. ROSSI, OF NEW YORK, AND ALEXANDRE BOURGOUGNON AND PAUL CASAMAJOR, OF BROOKLYN, N. Y.; ALGERNON S. SULLIVAN ADMINISTRATOR OF SAID DU MOTAY, DECEASED.

JELLIFYING PETROLEUM AND OTHER SUBSTANCES INSOLUBLE IN WATER.

SPECIFICATION forming part of Letters Patent No. 241,505, dated May 17, 1881.

Application filed February 19, 1880.

*To all whom it may concern:*

Be it known that we, CYPRIEN TESSIÉ DU MOTAY, a citizen of the Republic of France, now residing in the city, county, and State of New York, AUGUSTE JAMES ROSSI, a citizen of the United States, residing in the city, county, and State of New York, ALEXANDRE BOURGOUGNON, a citizen of the Republic of France, residing in Brooklyn, Kings county, State of New York, and PAUL CASAMAJOR, a citizen of the United States, residing in Brooklyn, Kings county, State of New York, have made a new and useful Improvement in Jellifying Petroleum and other Substances Insoluble in Water; and we do hereby declare that the following specification gives such a full, clear, and exact description of our invention as will enable others skilled in the art to which it appertains to practice the same.

Our invention relates to the treatment, among other substances, of hydrocarbons in general—such as naphthas, other petroleum products, and oil of turpentine—drying and non-drying oils—such as linseed or olive oil, bisulphide of carbon, and chloroform with gelatine dissolved in water—by which treatment any one of the substances belonging to the class above described may be formed into a semi-solid or jelly-like mass more or less stiff.

We will illustrate our invention by describing it as carried out with a substance belonging to the class previously referred to by us as suitable to be formed into jellies by this our process. The substance we will select is the ordinary kerosene or burning-oil of petroleum.

We have found that very small quantities of gelatine in solution, when energetically stirred with large amounts of the kerosene or burning-oil of petroleum, added gradually, will mix or combine together and will form a comparatively stiff jelly-like mass, to which, when so formed, we have given the name of "kerosene jelly." When substances other than kerosene are used, and when jellies are formed, we have given such jelly-like formations the name of "castor-oil jelly," "petroleum jelly," "naphtha jelly," &c, depending upon the substances combined or mixed with the gelatine or its equivalents.

The following is our process as carried out with kerosene: We dissolve, say, one pound of gelatine in the shape of the ordinary glue of commerce—the quality which sells in the market for about seven (7) to ten (10) cents per pound will answer the purpose—in water with the aid of a degree of heat below 212° Fahrenheit. For the one pound of glue we use to make the solution from ten (10) to forty (40) pounds of water. Less water is used when the jelly-like material is to go to warm countries, and more water when it is to be sent to colder countries. The solution of glue and water made as above is to be placed in a vessel of sufficient size, and a small stream of ordinary kerosene or burning-oil of petroleum is allowed to gradually flow into the glue solution. As the kerosene or burning-oil of petroleum is flowing into the glue solution the mixed kerosene or burning-oil and glue solution must be continually and very energetically stirred or agitated, either by revolving arms driven by power or by a hand-stirrer, but preferably by an appropriate mechanical contrivance. As the kerosene or burning-oil is gradually added and the compound or mixture is stirred it will be found that the fluid mass will gradually thicken, till after a certain time it will form a jelly-like mass. After the first formation of the jelly-like mass more kerosene may be added till upward of one hundred and fifty (150) pounds have been combined or mixed with the glue solution, the jelly-like consistency being preserved. If but small quantities of water have been used to dissolve the pound of glue, a few pounds of water may be added during the stirring operation to the jelly, which will again thicken by stirring and the addition of kerosene.

The time required to bring the before-mentioned substances or materials to the state of kerosene jelly will vary with the method of stirring adopted. If the stirring is very energetic, as with a device like a mechanical egg-beater, it takes, perhaps, about one-tenth as long as with hand-stirring, using a spoon, knife, or the like. We have reached a good jellified result in ten (10) minutes with energetic stirring, while it would by a more deliberate method have taken, perhaps, three-quarters of an hour. The best results are obtained by stirring continuously and with comparative regularity. A low degree of heat may be used during the stirring operation—say 110° Fahrenheit; but in no case should a degree of heat be used which will cause the kerosene or other substance to be wasted by giving off vapor, and for such substances as bisulphide of carbon it is not advisable to use artificial heat.

The kerosene jelly produced by the above process may be made more stable and less likely to separate into kerosene and glue solution by mixing with the glue solution before referred to from two (2) to ten (10) pounds of ordinary plaster-of-paris of a fine powder. After the addition of plaster-of-paris to the glue solution the process is to be carried out as has been previously described.

We know that wine has been mixed with gelatine in the ordinary jelly served upon the table as an edible compound; but this does not in any way come within our invention. Wine, weak alcohol, or like substances, by admixture with large quantities of gelatine, will flavor the edible compound called "jelly;" but the process is totally different from ours, and the results obtained also differ substantially from those obtained by our process, the addition of wine being merely for the purpose of flavoring the gelatine, and the object is not to jellify large quantities of wine.

We are also aware that soap-worts, or, rather, a product obtained from such a plant, has been mixed with unrefined petroleum and a thickish mass thus obtained. Neither the process nor the result is substantially the same as the process or the result reached by the practice of our invention. The thickish mass formed by mixing the petroleum and the soap-worts product together was very unstable, and soon resolved itself into the original substances used in making the mixture.

We are also aware of the ordinary inking-rollers used in printing-presses, which are made of glue and molasses, and also of the copying-pads now sold, composed of glue, glycerine, and molasses. None of these products or the processes involved in producing them show our invention.

Emulsions have been made with linseed or whale oil mixed with pigments and a solution of glue to form paint; but the product obtained does not resemble that obtained by our process.

We are further aware of the fact that whites of eggs have been added to chloroform, producing a jelly-like mixture, as set forth in the United States Dispensatory, page 1,042; but the process and product therein described differ essentially from our invention, inasmuch as the albuminous matter added forms a material portion of the volume of the product, the whole amount of chloroform and albuminous material to be jellified being added together at one operation, and, further, because the product of the mixture does not form a stable and permanent jelly, but changes its condition on exposure to the air.

The kerosene jelly, &c., may be applied to any purpose found suitable for such a compound or mixture. Though many of the jellies have in their constitution such enormous quantities of highly-inflammable substances, the jellies do not burn as readily as the refined oil, bisulphide of carbon, or other inflammable substances, and consequently they are less dangerous to transport. The jellies are more easily packed or transported than the fluid substances.

All of the substances which are capable of being treated by our process to produce the jellified result will, when mixed with water by agitation, afterward separate therefrom of their own accord.

The substances which are serviceable for our process are either totally insoluble in water or are only soluble in inappreciable quantities therein, and are therefore practically insoluble.

In the place of the gelatine which we have described as used in the foregoing process, we may use ordinary flour paste, gluten, (obtained by washing ordinary flour,) and the equivalent glutinous substances.

The proportions already given for mixing the glue and water are substantially correct for all the equivalents of glue here mentioned.

The substances of the class we have already referred to, and which are serviceable when treated with a solution of gelatine in water by our process to form the jellified result, are all to be treated in substantially the same way as we have described for the kerosene or burning-oil of petroleum.

The proportionate amount of the various substances which may be mixed or combined with one pound of glue dissolved in water will vary. The amount of water used to dissolve the glue may make a variation in the result, as will the amount of water added during the stirring. The following proportions have given very good results when tried: Take one ounce, by weight, of glue and dissolve it in thirty ounces of water. Then pour in gradually olive-oil and stir energetically. After about fifty ounces, by weight, of oil have been added, the solution will begin to thicken; soon the jelly will be formed, and after two hundred and fifty ounces, by weight, have been added the jelly will still be good; but a further addition causes the jelly formation to break up. The stirring should be constant as long as any addition is being made.

Another jelly may be made of the following: Take a solution of glue as used in the previous examples. Pour into it gradually linseed-oil and stir energetically. After about fifty ounces of oil have been added the solution will begin to thicken; soon the jelly will be formed, and after two hundred ounces have been added the jelly will still be good. A further addition spoils the jelly.

Another jelly may be made of the following: Take the same amounts of glue and water as before, and add gradually, while the mixture is being stirred, essential oil of turpentine. After the addition of forty ounces of turpentine the mass will begin to thicken; soon the jelly will be formed, and after one hundred and sixty ounces have been added the jelly will still be good. Further addition of turpentine in large quantities readily causes the jelly to break up.

Another jelly may be made of the following: Take the same amounts of glue and water as before and add gradually balsam of fir, stirring the mixture steadily. When fifty ounces of balsam of fir have been added the mass will begin to thicken; soon after the jelly will be formed, and when one hundred and fifty ounces have been added the jelly will still be good, but will be of a ropy or stringy consistency.

Another jelly may be made of the following: Take the same amounts of water and glue as before and add to the solution, while stirring, petroleum-naphtha in a small stream. After forty ounces have been added the mass will begin to thicken; soon the jelly will be formed, and when one hundred and ninety ounces have been added the jelly will still be good. Further addition spoils the jelly.

Another jelly may be formed of the following: Take the same amounts of glue and water as in the previous examples and add to the solution slowly, while being stirred vigorously, burning-oil of petroleum. After the addition of fifty ounces of burning-oil of petroleum the mass will begin to thicken; soon the jelly will form, and when two hundred and twenty-three ounces have been added the jelly will still be good. A further addition in considerable quantities spoils the jelly.

Another jelly may be made of the following: Take the same glue solution as used in the previous examples and add slowly, while the mass is being continually stirred, bisulphide of carbon. After the addition of about twenty ounces a very perceptible thickening will take place; soon the jelly will form, and when three hundred and eighty ounces have been added the jelly will still be very well formed, and no signs of its breaking up will be seen.

Another jelly may be made of the following: Take the same glue solution as used in the previous examples and add to it slowly, while being stirred, chloroform. After thirty ounces have been added a thickening of the mass will be observable, and soon, on further addition, the jelly will be formed. After four hundred ounces have been added the jelly will still be good, and will show no signs of breaking up.

Should it be desired to make any of the jellies stiffer, some more glue solution may be added.

When a glue solution of greater strength than one ounce of glue and thirty ounces of water is used, less of the oil, chloroform, &c., can be added, but the jelly will be stiffer.

In the previous examples the maximum amounts of substance to be jellified have been given for the glue solution there used. Generally, after the addition necessary to produce the thickening of the mass, a small further addition will produce the jelly, and its nature is not materially altered, except in volume, by the amounts which may be subsequently added, unless those amounts are sufficient to break up the jelly.

The amounts of the various substances hereinbefore given are probably larger in proportion to the glue solution herein stated than it would in practice be desirable to use, for in some cases the jellies would not be permanent, though for some processes the full amount, or even more, may be mixed or combined with a glue solution of the strength used in these examples. In all cases the stirring must be energetic during the addition of the material to the mass, and also in all cases the oil, naphtha, &c., must be fed slowly in a small stream.

The essence of our invention does not depend upon the exact proportions in which the substances can be mixed or combined to form the jellies, but in the discovery that when treated according to our process such small quantities of glue in solution will combine or mix with such large quantities of any of the substances of the class herein referred to to form the peculiar jellified masses herein described.

When the operator desires to jellify any substance belonging to the class herein referred to not specifically indicated by name in this specification, and for which the proportions are not herein given, he will not experience the slightest difficulty in ascertaining the quantity which may be jellified with a given amount of glue solution. All he has to do is to make his glue solution in the usual manner, and then carry out the process herein described; and when he has reached the jellified result, and has brought it to the condition usual with the product obtained by this our process, he will then have the desired information, though usually more liquid may be added after the jelly is formed.

From the nature of our process requiring in all cases energetic stirring and addition in small quantities, the operator cannot fail to reach the desired result if he operates upon substances capable of forming the jellified mass. This would not be the case did our process require that the whole amount of liquid to be jellified should be at once mixed with the glue solution.

Our invention also contemplates, besides the production of the jelly-like result by the practice of our process with any one of the class of substances, the subsequent liquefaction of any of the jellies thus produced, so that the liquid jellified may again be had, if desired, in the pure state. This, however, will form the subject for a separate application for Letters Patent.

When very volatile substances are being mixed or combined with the glue, gluten, or gelatine substances, as has been fully described in this specification, it is advisable that the operation should be carried on in closed vessels, so as to prevent loss by volatilization. The non-volatile substances may be treated in the same closed vessels, though it is not equally important under these circumstances to use closed vessels or tanks.

No special mechanism is necessary for the carrying out of our invention. We can practice it in a tin pail or in a specially-prepared tank costing thousands of dollars. However the mechanism should be formed, it should be remembered that the stirring-arms must be arranged to pass through as much of the mixture as possible, and that large unstirred portions must not be left in the vessel, else the result will not be satisfactory.

Our invention also contemplates the mixing or combining of the jellified material with other substances; but this will form the subject of a separate application for Letters Patent.

The uses of our invention are too numerous to be mentioned in detail. However, we can state as follows:

Bisulphide-of-carbon jelly may be used to kill the phylloxera—the insect which destroys the grape-vine.

Kerosene jelly, naphtha jelly, chloroform jelly, &c., are not as dangerous to transport as kerosene, naphtha, chloroform, &c. Though the jellies burn readily when ignited, they may be readily extinguished with water.

Heavy petroleum jelly, formed from petroleum not used for illuminating purposes, can be made into as thick a paste or jelly as is desired, and can be used for lubricating purposes.

Benzine jelly or turpentine jelly can be used for bleaching purposes, alone or mixed with soap, without injuring the tissues bleached.

We have used the word "jelly" for want of a better expression; but it is difficult to liken our product to any well known substance. The jellies produced by the majority of substances closely resemble in consistency warmed beef-marrow. Some jellies are ropy. To illustrate the consistency of our jellies: They will remain in a bottle when the cork is out and the bottle is inverted. When our jellies are exposed in open vessels, pencils and sticks can be stuck into them, and will remain upright, like pins in a pin-cushion.

We have included the substances treated under the general definition of "substances insoluble in water." We further define the class of materials—the equivalent of gelatine—which may be used in the treatment of said insoluble substances as substances capable of forming jellies with the first-named substances, this being a property common to gelatinous and other substances.

We do not here claim compounds produced by the combination of the products of the above-described treatment with other substances; nor do we here claim the modes of breaking up the mixtures, all of which will constitute the subjects of separate applications for Letters Patent; but

We claim—

1. The mode described of jellifying petroleum and other substances insoluble in water, as above described, the same consisting in adding such substance gradually, while agitating, as described, to a solution of gelatine or its described equivalent until a jelly-like product is secured, substantially as set forth.

2. The product obtained by the above process, consisting of the jellified substance resulting from the admixture, under agitation, of petroleum or other suitable substances described as insoluble in water, and a solution of gelatine or described equivalents.

In witness whereof we have hereunto set our hands and seals this 9th day of February, 1880.

C. M. TESSIÉ DU MOTAY. [L. S.]
AUGUSTE J. ROSSI. [L. S.]
ALEXANDRE BOURGOUGNON. [L. S.]
PAUL CASAMAJOR. [L. S.]

Witnesses:
CORNELIUS W. DEVER,
JOSEPH L. LEVY.